UNITED STATES PATENT OFFICE.

BYRON B. GOLDSMITH, OF NEW YORK, N. Y.

CASEIN COMPOUND.

No. 840,931.	Specification of Letters Patent.	Patented Jan. 8, 1907.

Application filed August 28, 1906. Serial No. 332,395.

*To all whom it may concern:*

Be it known that I, BYRON B. GOLDSMITH, a citizen of the United States, and a resident of New York, in the county of New York and State of New York, have invented certain new and useful Improvements in Casein Compounds, of which the following is a specification.

My invention has reference to a new composition of matter, consisting of casein and certain ingredient or ingredients which, for reasons which are explained farther on, I have called "converting" agents or "casein-converters."

The main characteristic of the new composition of matter is that it becomes plastic and moldable when heated, so that it can be used for a great variety of purposes and in many of its forms for the same purpose for which celluloid is used in the arts, and it is, in fact, mainly, although not exclusively, designed for use as a substitute for celluloid or also as a substitute for horn and hard and soft rubber and other like substances.

My new composition of matter in some of its forms most nearly resembles celluloid in that in can be rolled out into sheets, drawn into tubes, and can be molded and remolded any number of times to any desired shape, so that scraps can be collected and united into a solid mass of any desired form.

Many attempts have heretofore been made to use casein masses in the arts; but none of them have been successful on account of the difficulty of working the material into desired shapes, which had to be done largely by turning, carving, drilling, cutting, and other like procedures in about the same manner in which wood would be shaped. None of these old casein masses could be rolled out into sheets which could be molded and remolded at will any desired number of times, since none of these old masses had the one property upon which the extensive use of such substance in the various arts largely depends—namely, plasticity.

Casein itself and its derivatives are not plastic; but in accordance with my invention such substances are rendered plastic under heat to any desired degree. I have discovered that when casein is brought into intimate contact with certain chemical compounds the casein coalesces with these compounds and forms with the same the new substance, which may be called "converted" casein or "thermoplastic" casein. Some of the compounds which I have found to act as converters of casein are alpha-naphthol, beta-naphthol, benzoic acid, carbolic acid, hydrochinon, kresol, pyrocatechin, resorcin, salicylic acid, and urea. There are other compounds which act as converting agents on casein, and I am not limited to the use of the compounds which I have enumerated, although these yield good results.

In order that the crude casein or any of its derivatives become converted into the new state, it must be brought into intimate contact with the converting agent or agents employed, and this may require the application of heat or of heat and pressure, or it may in some cases be effected without heat and pressure, according to the particular converting agent and the form in which it is employed.

The action of the converting agent in causing casein or its derivatives, which are not plastic, to become plastic, although not fully understood by me, I believe to be due to the solvent action of the converting agent. If a quantity of a converting agent—say resorcin—is put into a test-tube and is heated until it is melted and a piece of casein is dropped into the same the casein gradually disappears in the fusion. Other converting agents act in a similar manner on casein. There are, however, some converting agents which do not convert the casein quite as completely as resorcin and others, and when these less powerful converters are heated and the casein is dropped into them the latter does not disappear in the fusion, but is simply softened and swells up.

The degree of hardness attained by the product in the cold state varies with the kind of converting agent employed, and ordinarily the new composition will be softer in the cold state and more plastic when heated when a greater quantity of converting agent is employed. Liquid converting agents will also usually give a softer product than solid ones, and when a liquid converting agent is used in sufficient quantity the new compound can be made with any degree of pliability and flexibility in the cold. This same result can be obtained by the use of a solid converting agent with the addition of a liquid which is not antagonistic to the mixture, such as glycerin. I am thus enabled to vary the hardness and thermoplasticity of the new composition of matter throughout a very wide range by using different converting agents or by employing several converting agents together and in various proportions and by using different amounts of crude casein or casein compound. In this manner I have made converted casein that became plastic by the heat of the hand and others that require the heat of steam at eighty pounds pressure to become plastic.

A characteristic of some of the converting agents upon which the continued thermoplastic property of the new composition depends is their tendency to remain in the compound and not to volatilize to any marked degree. Altogether the converting agents behave with respect to and act upon the casein in a similar manner as camphor upon nitrocellulose in the formation of celluloid. Nitrocellulose by itself is not plastic, but becomes so when mixed with camphor.

In the practical manufacture of my new composition of matter the casein may be united with the converting agent on and between suitably-heated rolls the same as nitrocellulose and camphor are united in the manufacture of celluloid. Any method, however, will answer by which the casein is brought into intimate contact with the converting agent whether or not heat and pressure be employed. Instead of using the converting agents in their natural state I can with advantage first dissolve them in alcohol or water or other suitable liquid. A liquid which readily evaporates is advisable. No definite proportions of the ingredients can be or need be stated, since a wide range of proportions is permissible, depending upon the degree of hardness and thermoplasticity aimed at. One of the numerous practicable proportions which I have used and the manner of procedure employed is the following: I have used three pounds of dry casein, one-half pound of beta-naphthol, and one pint of alcohol. The naphthol was first dissolved in the alcohol, and the solution was sprinkled upon the casein, so as to thoroughly moisten the same. The mass was then kneaded between moderately-heated rolls until it became uniform throughout. In this condition the mass was then rolled out into sheets and these sheets remained flexible at ordinary temperatures until the alcohol had evaporated, when they became hard at ordinary temperatures, but quite plastic when heated.

It will be readily understood that large quantities of compounding materials or admixtures can be kneaded in with the casein on the rolls, the same as is done in the manufacture of rubber and celluloid. More particularly is it practicable to knead into the mass scraps of waste celluloid, finely-divided horn, rubber, resins, gums, and coloring-matter, and in this manner a great variety of converted casein compounds can be produced, each having a peculiarity of its own. Glycerin may also be mixed into the mass for rendering the product more flexible. The sheets as they come from the mixing-rolls or calenders may with advantage be pressed between heated plates to complete the conversion.

Instead of using casein alone or casein with such admixtures as above broadly indicated for the production of converted casein or converted casein compounds, I may use any of the derivatives of casein known in the arts, such as the compounds of casein with acids, bases, and salts, and I wish it to be understood that in my claims the term "casein" is employed to include the derivatives of casein, since I have found the latter to act similarly to the pure casein.

Having now described my invention, I claim and desire to secure by Letters Patent—

1. The process of making a composition of matter which consists in uniting casein with an agent or agents which render the same moldable or thermoplastic, substantially as described.

2. The process of making a composition of matter, which consists in uniting casein under heat and pressure with an agent or agents which render the same moldable or thermoplastic, substantially as described.

3. The process of converting casein into a moldable or thermoplastic state, which consists in uniting casein with beta-naphthol or its equivalents.

4. The process of converting casein into a moldable or thermoplastic state, which consists in uniting casein under heat and pressure with beta-naphthol or its equivalents, substantially as described.

5. The process of making a thermoplastic composition of matter, which consists in uniting casein with an agent or agents which render the casein thermoplastic and with compounding materials or admixtures, substantially as described.

6. The process of making a thremoplastic composition of matter which consists in uniting casein under heat and pressure with an agent or agents which render the casein thermoplastic and with compounding materials or admixtures, substantially as described.

7. The composition of matter consisting of thermoplastic casein, substantially as described.

8. The composition of matter consisting of casein and beta-naphthol or its equivalents, substantially as described.

9. The composition of matter consisting of casein, beta-naphthol or its equivalents and compounding material, substantially as described.

10. The composition of matter which consists of thermoplastic casein and compounding materials, substantially as described.

In testimony whereof I have signed my name to this specification in the presence of two subscribing witnesses.

BYRON B. GOLDSMITH.

Witnesses:
OSCAR WIENER,
HENRY WIENCKE.